United States Patent

Chang

[11] Patent Number: 5,831,817
[45] Date of Patent: Nov. 3, 1998

[54] COMPUTER APPARATUS HAVING A MOVABLE LIQUID CRYSTAL DISPLAY

[75] Inventor: Tod Chang, Taipei, Taiwan

[73] Assignee: Mitac International Corporation, Hsinchu, Taiwan

[21] Appl. No.: 876,835

[22] Filed: Jun. 16, 1997

[51] Int. Cl.$^6$ .................................. G06F 1/16; H05K 5/02
[52] U.S. Cl. ........................... 361/681; 345/905; 361/727
[58] Field of Search .................................. 361/680–683, 361/686, 727; 235/1 D, 145 R, 146; 345/168, 169, 905; 364/708.1; G06F 1/16

[56] References Cited

U.S. PATENT DOCUMENTS

| | | | |
|---|---|---|---|
| 5,548,478 | 8/1996 | Kumar et al. | 361/681 |
| 5,600,580 | 2/1997 | Honjo et al. | 364/708.1 |
| 5,644,469 | 7/1997 | Shioya et al. | 361/681 |
| 5,708,561 | 1/1998 | Huilgol et al. | 361/681 |
| 5,712,760 | 1/1998 | Coulon et al. | 361/680 |
| 5,717,431 | 2/1998 | Chia-Ying et al. | 345/168 |

*Primary Examiner*—Lynn D. Feild
*Attorney, Agent, or Firm*—Harness, Dickey & Pierce, P.L.C.

[57] ABSTRACT

A computer apparatus having a movable liquid crystal display (LCD) is disclosed herein. The peripherals are set on the top side or surrounding area of the surface of the main computer. The movable LCD is designed to cover all peripherals such that the peripherals can be concealed behind the movable LCD in normal time. A mechanical slipping apparatus is set between the movable LCD and the main computer. When a user wants to use these peripherals, they can be exposed via horizontally moving or vertically moving the movable LCD. The movable LCD can be driven to move by using a manual method or electromotive method via the mechanical slipping apparatus. Therefore, the peripherals can be exposed to the user for utilizing them.

16 Claims, 4 Drawing Sheets

COMPUTER APPARATUS HAVING A MOVABLE LIQUID CRYSTAL DISPLAY

BACKGROUND OF THE INVENTION

1. Field of the Invention

The present invention relates to associated peripherals of a personal computer (PC), and more particularly to a computer apparatus having a movable liquid crystal display (LCD).

2. Description of the Prior Art

At the present time, liquid crystal display (LCD) of a personal computer is designed as a fixed form. Typically, a LCD monitor is situated on the surface of the main personal computer (PC). Other associated peripherals of the personal computer (PC), such as a digital camera having charge coupled devices (CCD) and a compact disc-read only memory (CD-ROM), are all set on the top-side or surrounding portion of the LCD monitor. Typically, a CD-ROM is designed as a drawing form CD-ROM. It is laid within the main computer. The drawing form CD-ROM can be pushed into the main computer or pulled out of the main computer. Therefore, it is necessary to have an extra horizontal room for accommodating the entire CD-ROM size within the main computer. The depth for accommodating the entire CD-ROM size is usually considered by computer designers. Additionally, other associated peripherals of the personal computer adjacent to the LCD monitor on the surface of the main computer also occupy a lot of space so that these peripherals will waste space for a user. In recent years, with LCD advances in the size, efforts have been made to improve original problems for the space application of peripherals. The LCD will have some advantage such as the maximizing of the surface area and the minimizing of thickness. Therefore, the present invention will utilize these merits to improve the space waste and minimize entire computer size.

Furthermore, the integral technique between a personal computer and household electronic products will intend to stabilize. In the future, a household computer will be popular and the technique of a household computer will become an important field. Wall LCD computer will be an important kind of household computer in the future. Typically, household electronic products are required to operate easily. Therefore, a user only controls a few keys of the computer to operate the household electronic product ordinarily. While some important procedures are needed to control or some electronic equipment are required to reset up, a main keyboard for the user is necessary. The LCD monitor has some advantages such as its large surface area, its small thickness and its small space utilization. Therefore, the wall LCD computer will be adopted for household electronic products in the future such that it can achieve the goal of concealing the peripherals of the computer in normal time and easily applying them.

SUMMARY OF THE INVENTION

It is a primary object of the present invention to provide a computer apparatus having a movable LCD. The movable LCD can be moved horizontally toward the left or the right can even can be vertically moved up or down by a mechanical slipping apparatus. The LCD is moved via the control of the mechanical slipping apparatus by using a manual method or electromotive method. Afterward, the associated peripherals (such as digital camera, CD-ROM and keyboard) concealed behind the LCD are exposed for a user. Therefore, the structure of the computer having the movable LCD can reduce the space waste.

Accordingly, the present invention provides a computer apparatus having a movable LCD. The apparatus includes a main computer, associated peripherals, a movable liquid crystal display (LCD), and a mechanical slipping apparatus. The main computer processes data. The movable LCD which displays data can cover all peripherals of the personal computer. The peripherals are set on the surrounding surface area of the personal computer and are concealed behind the movable LCD. The mechanical slipping apparatus is set between the movable LCD and the main computer. When a user wants to use associated peripherals, the movable LCD is moved via the mechanical slipping apparatus to expose the peripherals for application.

BRIEF DESCRIPTION OF THE DRAWINGS

Various embodiments are described herein with reference to the drawings, wherein.

DESCRIPTION OF THE PREFERRED EMBODIMENT

Figure 1A:
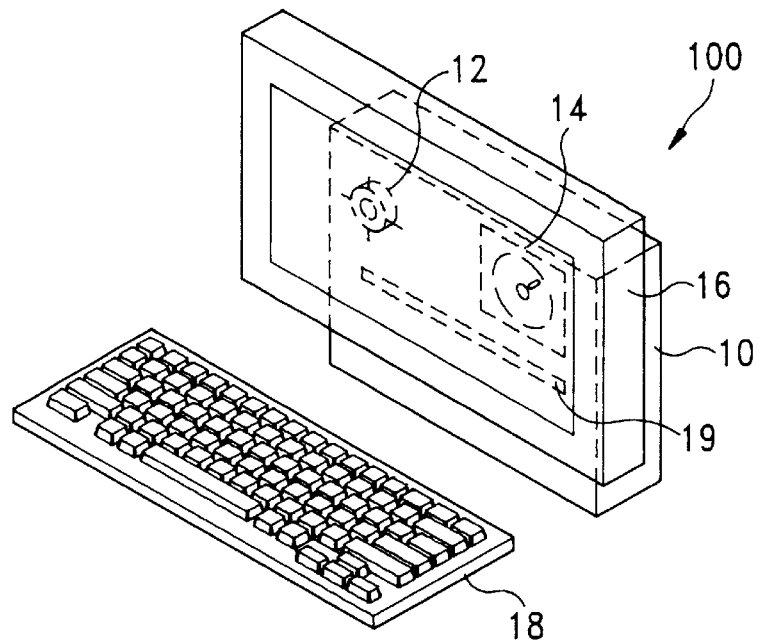
FIG. 1A is a drawing showing a computer apparatus having a movable LCD according to the first embodiment of the present invention.

Referring to FIG. 1A, a computer apparatus 100 is shown having a movable liquid crystal display (LCD) 16 according to the first embodiment of the present invention. The associated peripherals (such as digital camera 12 and the obverse form CD-ROM 14 except LCD 16) of the main computer 10 are all set on the top side or surrounding area of the surface of the main computer 10. The structure of the present invention apparatus is different from the conventional apparatus. In the conventional computer apparatus, some associated peripherals including LCD are all set on the surface of the main computer. The other peripherals are set on the top side or surrounding area of LCD. Therefore, the design of the conventional computer apparatus occupies too much surface space, which leads to the limitation of computer size. The present invention only provides a movable LCD 16 and a keyboard 18 to a user for operating the computer in normal time. Other peripherals are concealed behind the movable LCD 16. While the user wants to use them, the movable LCD 16 will be moved via a mechanical slipping apparatus 19 to expose the peripherals concealed behind the movable LCD 16 for the user. The mechanical slipping apparatus 19 is made of two slipping components. One is a first connector set on the surface of the main computer 10, and another is a second connector set on the surface of the movable LCD 16. Through the first connector and the second connector slipping with respect to each other by using a manual method or electromotive method, the movable LCD 16 can be horizontally moved toward the left or the right to expose the peripherals.

Figure 2A:
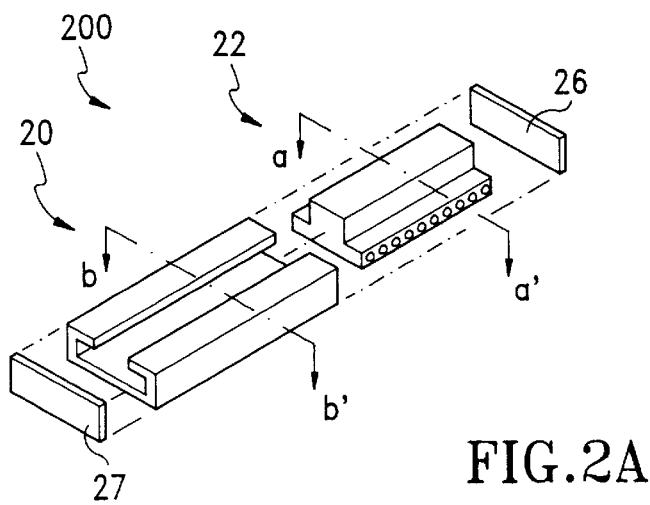
FIG. 2A is a drawing showing a structure of a mechanical slipping apparatus.
Figure 2B:
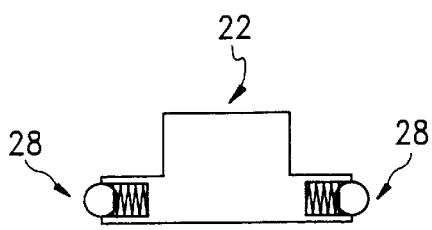
FIG. 2B is a drawing showing a cross-section view according to line a—a' of FIG. 2A.

Referring to FIG. 2A, an embodiment showing a mechanical slipping apparatus 200 is illustrated. FIG. 2B is a cross-section view showing a T-shape protrudent track according to line a—a' of FIG. 2A.

Figure 2C:
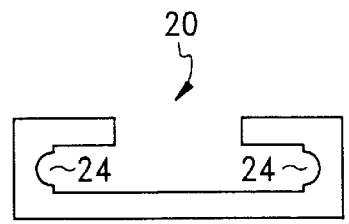
FIG. 2C is a drawing showing a cross-section view according to line b—b' of FIG. 2A.

FIG. 2C is a cross-section view showing a T-shape depression track according to line b-b' of FIG. 2A. The first connector is situated on the surface of the main personal computer 10, and the second connector is situated on the back-side surface of the movable LCD 16. The mechanical slipping apparatus 200 includes the first connector and the second connector. The first connector is designed as a T-shape depression track 20. A plurality of lock holes 24 are set inside the T-shape depression track 20. A first stop plate 26 and a second stop plate 27 are situated at both end portions of the T-shape depression track 20, respectively. The second connector can be designed as a T-shape protrudent track 22. A plurality of spring latches 28 are set on two sides of the edge surface of the T-shape protrudent track 22. The T-shape depression track 20 is connected to the T-shape protrudent track 22. Through T-shape depression track 20 and T-shape protrudent track 22 slipping with respect to each other with a manual method or electromotive method, the movable LCD can be driven to move along the left or the right horizontal direction. At this time, peripherals can be exposed. Additionally, a plurality of spring latches 28 and lock holes 24 are utilized as the control of fixing location. The first stop plate 26 and the second stop plate 27 can prevent T-shape protrudent track 20 from slipping out of T-shape depression track 22. At the opposite side, the first connector also can be designed as a T-shape protrudent track and the second connector can be designed as a T-shape depression track.

Figure 1B:
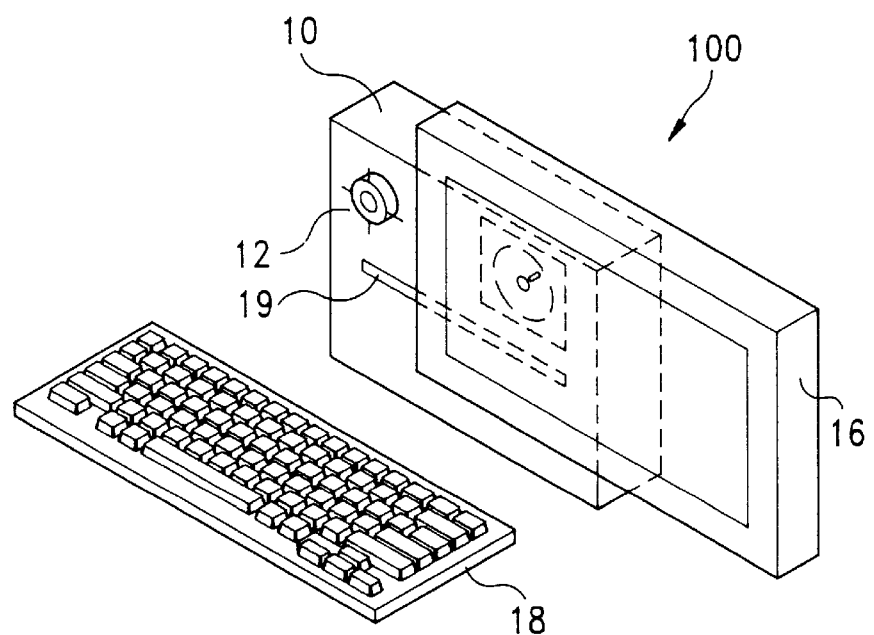
FIG. 1B is a drawing showing the movable LCD moved toward the right direction to expose a digital camera according to the first embodiment of the present invention.

Referring to FIG. 1B, the movable LCD 16 can be moved along the right direction to expose digital camera 12 to a user for using it in a conference.

Figure 1C:
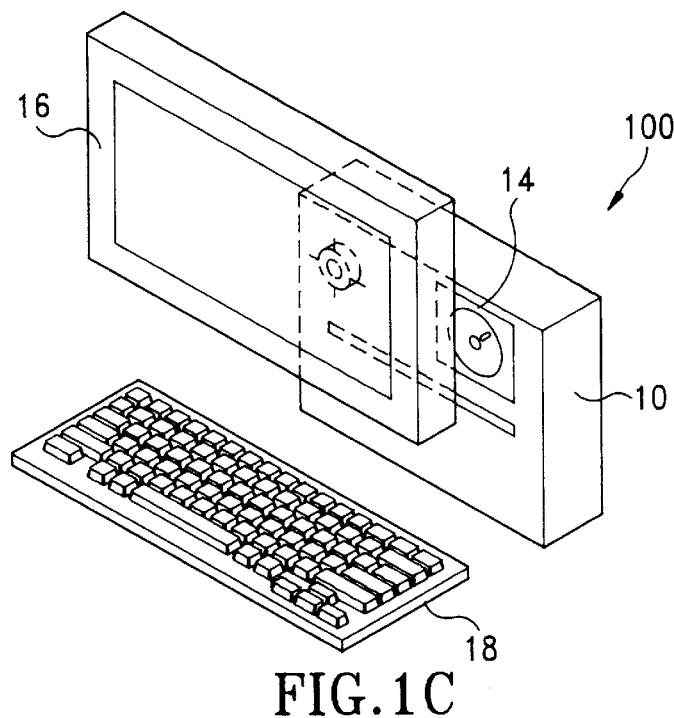
FIG. 1C is a drawing showing the movable LCD moved toward the left direction to expose a CD-ROM according to the first embodiment of the present invention.

Referring to FIG. 1C, the movable LCD 16 can be moved along the left direction to expose CD-ROM 14. The CD-ROM 14 is designed as an obverse form CD-ROM set on the surface of the main personal computer 10. When a user wants to operate the obverse form CD-ROM 14, a disc can be obversely put into the obverse form CD-ROM. The obverse form CD-ROM is different from the conventional drawing form CD-ROM. The obverse form CD-ROM 14 is directly attached on the surface of the main computer 10. The conventional drawing form CD-ROM is laid within the main computer, and will occupy extra horizontal room for accommodating the entire CD-ROM size. Therefore, the obverse form CD-ROM can save more space than the conventional drawing form CD-ROM. In the present invention, the peripherals such as obverse form CD-ROM 14 and CCD digital camera 12 are located on the top side or surrounding area of the surface of the computer 10, and are concealed behind the movable LCD in normal time. When a user wants to use these peripherals, they can be exposed via moving the movable LCD. A power supply is set at the bottom of the computer 10. Therefore, the center of gravity of the computer will not be influenced by the peripherals such as the obverse form CD-ROM and digital camera, etc. Additionally, the obverse form CD-ROM which is designed to stand erect on the surface of the main computer is different from the conventional drawing form CD-ROM which is laid within the computer. Therefore, this design method can reduce the depth of the personal computer. In the future, it will have a tendency to reduce the space waste of the computer for a user.

Figure 3A:
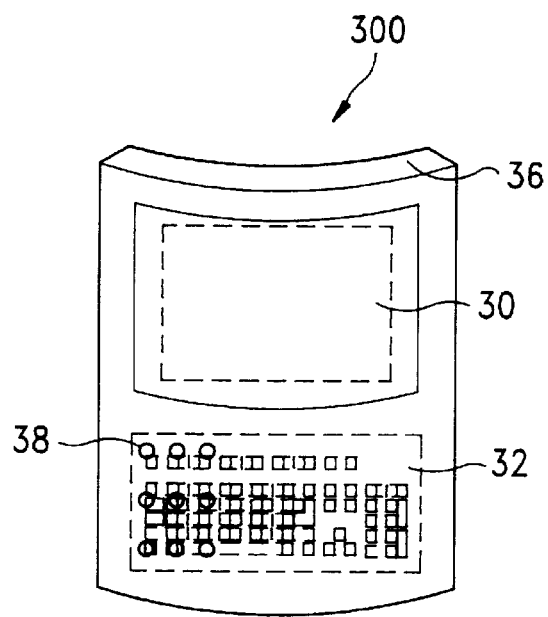
FIG. 3A is a drawing showing a wall computer having a movable LCD according to the second embodiment of the present invention.
Figure 3B:
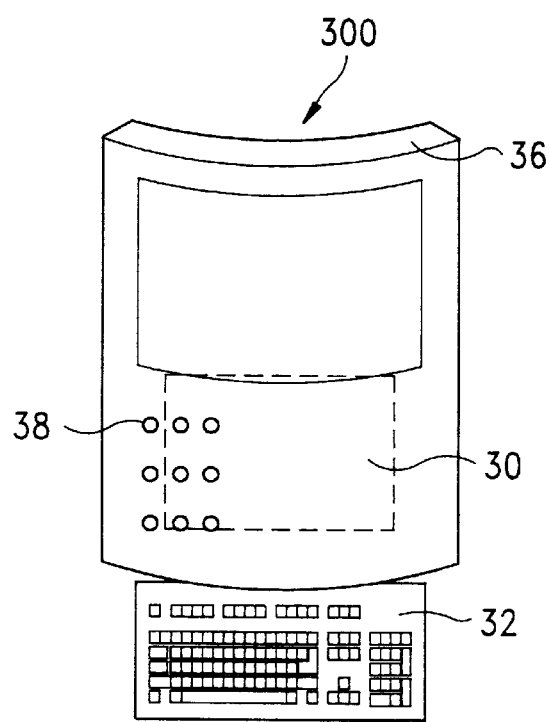
FIG. 3B is a drawing showing the movable LCD moved toward the up direction to expose a keyboard according to the second embodiment of the present invention.
Figure 4A:
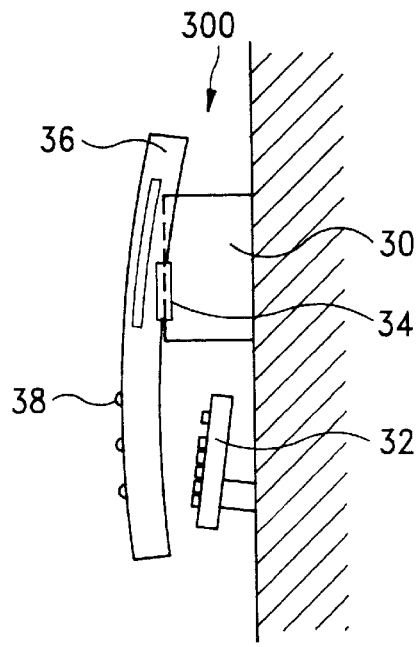
FIG. 4A is the side view according to FIG. 3A.
Figure 4B:
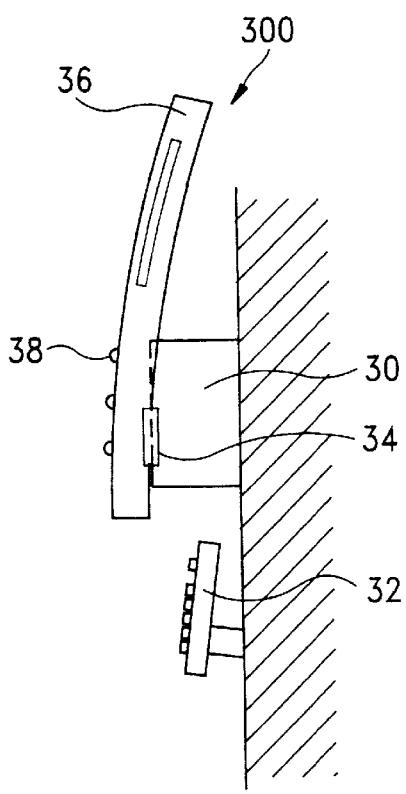
FIG. 4B is the side view according to FIG. 3B.

In another embodiment of the present invention, a computer apparatus having a movable LCD can be designed as a wall LCD computer 300 that is located on the wall. Associated peripherals, such as keyboard 32, etc., can be concealed behind the movable LCD 36 in normal time, and they can be exposed to operate them by moving the movable LCD 36. Referring to FIG. 3A and FIG. 4A, a main personal computer 30 is located on the wall. A keyboard 32 which is under the main personal computer 30 is also set on the wall. A mechanical moving apparatus 34 can be set between the main computer 30 and the movable LCD 36 along the vertical direction. The structure of the mechanical moving apparatus 30 can be designed the same with the first embodiment of the present invention. The mechanical moving apparatus 30 includes a first connector and a second connector. Through the first connector and the second connector slipping with respect to each other, the movable LCD 36 can be driven to vertically move. Therefore, the main keyboard 32 concealed behind the LCD 36 will be exposed. With a tendency about LCD with an increasing surface area and a reducing volume, an expanding space behind the LCD will be more and more. Therefore, the present invention will utilize this characteristic portion to create a wall computer 300. The movable LCD 36 is designed to cover all peripherals in normal time. When a user wants to use them, the movable LCD 36 can be moved along the up direction to expose them via the mechanical slipping apparatus 34. Referring to FIG. 3B and FIG. 4B, after the movable LCD 36 is moved along the up direction, the main keyboard 32 is exposed. In normal time, the wall LCD computer 300 can be controlled by pressing a few keys 38 on the surface of LCD 36 case. The main keyboard 32 which can control some important procedures is concealed behind the movable LCD 36. Therefore, this designed method can prevent children from inattentively touching the main keyboard 32 thus achieving a safety aim.

Accordingly, in the present invention, the peripherals are set on the top side or surrounding area of the surface of the main computer. The peripherals can be concealed behind a movable LCD. When a user wants to use these peripherals, they can be exposed via moving the movable LCD toward the horizontal or vertical direction. A mechanical slipping apparatus is set between the movable LCD and the main computer. The movable LCD can be driven to move with a manual method or electromotive method via the mechanical slipping apparatus. Therefore, the peripherals can be exposed. Furthermore, an obverse form CD-ROM and concealed keyboard can provide a preferred space application for a user.

Although specific embodiments including the preferred embodiment have been illustrated and described, it will be obvious to those skilled in the art that various modifications may be made without departing from the spirit and scope of the present invention, which is intended to be limited solely by the appended claims.

What is claimed is:

1. A computer apparatus comprising:

a main computer for processing data;

a plurality of peripherals set on a surround area of a surface of said main computer;

a liquid crystal display for displaying data and covering said plurality of peripherals; and means for moving said liquid crystal display so that said plurality of peripherals are exposed, said moving means being set between said main computer and said liquid crystal display, said moving means comprising a first connector of a T-shaped depression track and a second connector of a T-shaped protrudent track, said first connector mounting to said second connector to move said liquid crystal display, said T-shaped depression track having a plurality of lock holes inside, said T-shaped protrudent track having a plurality of spring latches set on two sides of edge surfaces, said spring latches and lock holes being utilized as a control of fixing locations.

2. The computer apparatus of claim 1, wherein said first connector is set on back-side surface of said liquid crystal display, and said second connector is set on the surface of said main computer, said first connector being slidably mounted to said second connector to move said liquid crystal display.

3. The computer apparatus of claim 1, wherein said first connector is set on the surface of said main computer, and said second connector is set on a back-side surface of said liquid crystal display, said first connector being slidably mounted to said second connector to move said liquid crystal display.

4. The computer apparatus of claim 1, wherein said T-shape depression track has a first stop plate at one end portion of said T-shape depression track and a second stop plate at another end portion of said T-shape depression track, said first and second stop plates preventing said T-shape protrudent track from slipping out said T-shape depression track.

5. The computer apparatus of claim 1, wherein said liquid crystal display horizontally moves to expose said peripherals via said moving means.

6. The computer apparatus of claim 1, wherein said liquid crystal display vertically moves to expose said peripherals via said moving means.

7. A computer apparatus comprising:

a main computer for processing data;

a plurality of peripherals set on a surrounding area of a surface of said main computer;

a liquid crystal display for displaying data and covering said plurality of peripherals; and means for moving said liquid crystal display so that said plurality of peripherals are exposed, said moving means being set between said main computer and said liquid crystal display, said moving means comprising a first connector defining a depression track and a second connector defining a protrudent track, said first connector mounting to said second connector to move said liquid crystal display, one of said depression track and said protrudent track having a plurality of lock holes inside, the other of said protrudent track and said depression track having a plurality of spring latches, said spring latches and lock holes being utilized as a control of fixing locations.

8. A computer apparatus comprising:

a main computer for processing data;

a plurality of peripherals set on the surrounding area of the surface of said main computer;

a liquid crystal display for displaying data and covering said plurality of peripherals;

a first connector set on the surface of said main computer;

a second connector set on the back-side surface of said liquid crystal display for mounting slidably to said first connector, said liquid crystal display moved to expose said plurality of peripherals via slipping said first connector in relation to said second connector; and a location fixing mechanism between said first connector and said second connector, said fixing mechanism comprised of recessed regions and resilient latches for being utilized as a control of fixing locations.

9. The computer apparatus of claim 8, wherein said first connector is a T-shape depression track, and said second connector is a T-shape protrudent track.

10. The computer apparatus of claim 9, wherein said T-shape depression track has a first stop plate at one end portion of said T-shape depression track and a second stop plate at another end portion of said T-shape depression track, said first and second stop plates preventing said T-shape protrudent track from slipping out said T-shape depression track.

11. The computer apparatus of claim 9, wherein said T-shape depression track has a plurality of lock holes to serve as said recessed regions inside said T-shape depression track, and said T-shape protrudent track having a plurality of spring latches to serve as said resilient latches on two sides of the edge of said T-shape protrudent track.

12. The computer apparatus of claim 8, wherein said first connector is a T-shape protrudent track, and said second connector is a T-shape depression track.

13. The computer apparatus of claim 12, wherein said T-shape depression track has a first stop plate at one end portion of said T-shape depression track and a second stop plate at another end portion of said T-shape depression track, said first and second stop plates preventing said T-shape protrudent track from slipping out said T-shape depression track.

14. The computer apparatus of claim 12, wherein said T-shape depression track has a plurality of lock holes to serve as said recessed regions inside said T-shape depression track, and said T-shape protrudent track having a plurality of spring latches to serve as said resilient latches on two sides of the edge surface of said T-shape protrudent track.

15. The computer apparatus of claim 8, wherein said liquid crystal display horizontally moves to expose said peripherals via slipping said first connector in relation to said second connector.

16. The computer apparatus of claim 8, wherein said liquid crystal display vertically moves to expose said peripherals via slipping said first connector in relation to said second connector.

* * * * *